000000000000000000
United States Patent Office 3,671,134
Patented June 20, 1972

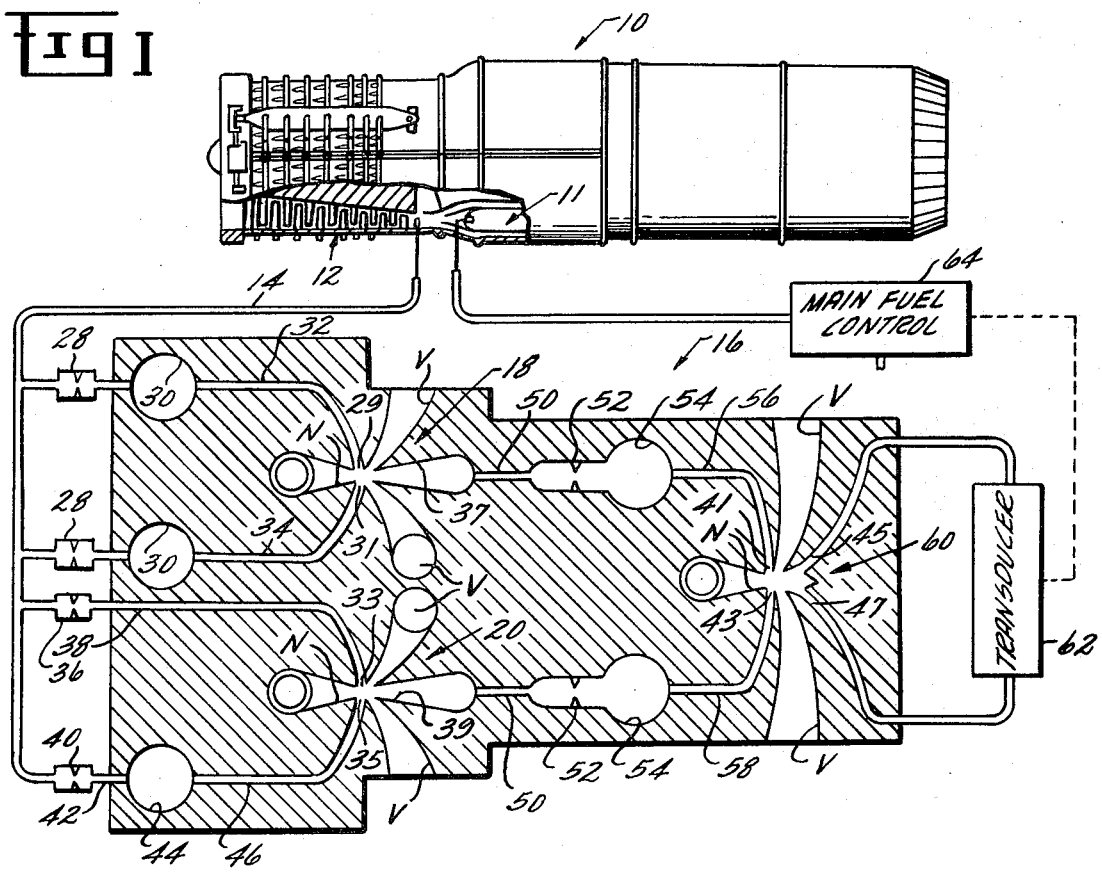
Fig 1
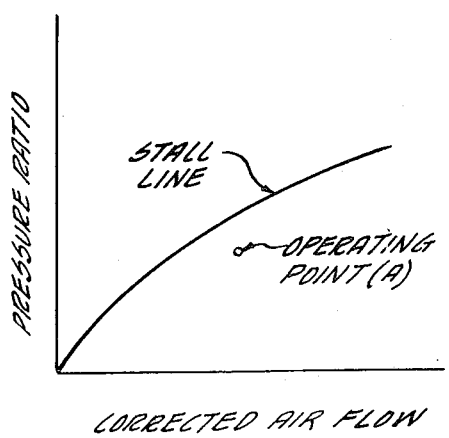
Fig 2
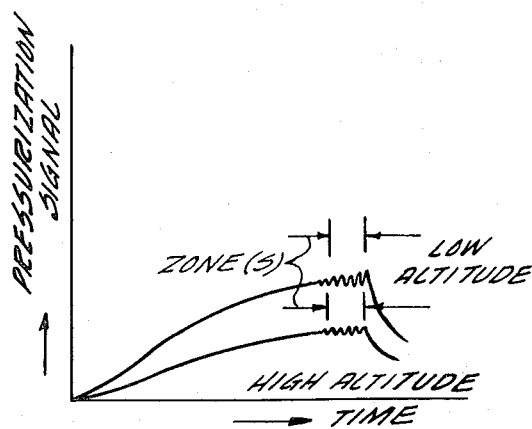
Fig 3
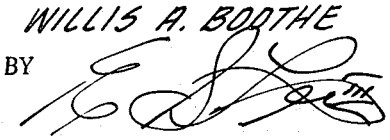

3,671,134
FLUIDIC SIGNAL DETECTION AND PREVENTION OF STALL IN COMPRESSORS FOR GAS TURBINE ENGINES
Willis A. Boothe, Scotia, N.Y., assignor to General Electric Company
Filed Sept. 27, 1967, Ser. No. 679,584
Int. Cl. F04d 27/02
U.S. Cl. 415—13
9 Claims

ABSTRACT OF THE DISCLOSURE

The disclosure shows fluidic means for detecting incipient stall of an axial flow compressor employed in a gas turbine engine. Fuel flow is modified as a result of such detection to move the operating point of the compressor away from a stall condition. Rapid fluctuations in the output pressure of the compressor, preferably in the range of 250 to 1,000 cycles per second, actuate the fluidic system to cause the change in fuel flow.

---

The present invention relates to improvements in gas turbine engines and, more particularly, to improved means for detecting an incipient stall condition to provide for a change in the operating point of the compressor which will avoid a full stall condition and, more broadly, to improved fluidic signal detection circuits.

Axial flow compressors, as used in gas turbine engines, comprise alternating circumferential rows of rotating and stationary airfoil shaped blades, each adjacent pair of which forms a compressor stage. Flow of air over, or past, these blades is essentially the same as over an airplane wing. When the pressure ratio across a given stage of blades or a number of stages of blades is too great, a stall condition results in which there is a serious drop in pressurization and air flow through the compressor. Where the compressor is incorporated in a gas turbine engine, there is a serious reduction, if not a complete loss, of power output.

This relationship is generally referenced to a compressor map which is a plot of the pressure ratio across a compressor against the corrected air flow therethrough. For a given compressor design there is a "stall line," indicating the maximum pressure ratio, for progressively increasing air flows, which can be tolerated without the occurrence of a stall condition. The operating point of the compressor is the specific air flow and pressure ratio at a given operating condition. Operating conditions can be changed to move the operating point towards or away from the stall line, as by increasing or decreasing fuel flow. One of the problems in the operation of gas turbine engines is that, under some conditions, as during acceleration, it is desirable that the operating point of the compressor be as close to the stall line as possible.

Many different approaches have been made to controlling the operating condition of a gas turbine engine to prevent occurrence of a stall condition. The usual approach is to empirically derive a compressor map for a given engine and then limit fuel flow as a function of the pressure ratio across the compressor (with temperature compensation) so that the operating point of the compressor is always maintained below the stall line. However, this mode of operation has limitations in that the characteristics of compressors will vary relatively widely, even though of the same design. Thus, to insure safety of operation, with this indirect control approach, the operating line of the compressor must be moved away from the theoretical maximum of the stall line to account for engine-to-engine or compressor-to-compressor variation. The net result is that operation of gas turbine engines is arbitrarily set below the maximum performance capabilities of the engine so that maximum power and economy are not necessarily available from a given engine.

The object of the invention is to detect an incipient stall condition of a compressor and to maintain its operating point as safely as possible to its stall line and thus obtain maximum power output from a gas turbine engine, particularly during acceleration.

These ends are attained with a fluidic circuit, in which a signal reflecting a pressurization level of a compressor is first derived and fed thereto. Means responsive to relatively rapid fluctuations in the signal, above a given frequency, are proportionately amplified to provide a signal anticipatory of a stall condition. Means responsive to this anticipatory signal actuate means for moving the operating point of the compressor away from a stall condition at a rate proportionate to the anticipatory signal. More specifically, an air signal is derived from a pressurized stage of the compressor. Fluidic means, responsive to rapid fluctuations in said air signal, preferably in the range of 250 to 1,000 cycles per second, produce the stall anticipation signal.

Other features of the invention are found in the use of a fluidic device having opposed control inputs, one of which is connected directly to the pressurized air signal and the other of which is provided with a volume or chamber through which the same signal passes to attenuate relatively slow changes in signal pressure. Thus, where the pressurization level of the compressor changes because of changes in altitude or speed, there is no false stall anticipation signal generated. Further means are provided for compensating the effects of changes in the strength of the pressurization on the power stream of a fluidic device to insure accurate operation over a wider range of pressures.

The above and other related objects and features of the invention will be apparent from a reading of the following description of the disclosure found in the accompanying drawing and the novelty thereof pointed out in the appended claims.

In the drawing, FIG. 1 is a schematic view of a gas turbine engine and an incipient stall detection system therefor;

FIG. 2 is a representative compressor map; and

FIG. 3 is a plot of compressor pressure, as it varies with time, as pressure is increased.

The present control system, as seen in FIG. 1, is illustrated in combination with a gas turbine engine 10 of the type normally employed for the propulsion of aircraft. Such engines comprise an axial flow compressor, indicated at 12, for pressurizing air to support combustion of fuel in a combustor 11 to thereby generate a hot gas stream which is employed to drive the rotor of the compressor and then discharged through a nozzle to provide a propulsive force.

Referencing FIG. 2, compressor operation is generally referenced to a compressor map which is a plot of pressure ratio relative to corrected air flow through the compressor. A stall line indicates the maximum pressure ratio, for any given air flow, which can be obtained without stall of the compressor. The operating point (A) indicates the pressure ratio and air flow for a given set of compressor operating conditions. If the pressure ratio were increased transiently, the back pressure at the compressor discharge would increase and the operating point would move upward towards the stall line.

The system to be described prevents, or minimizes, the possibility of the operating point moving over the stall line so that safe operation of the engine will be assured.

A signal reflecting compressor discharge pressure is derived by a tap or conduit 14. This pressurization signal is fed to a stall anticipation circuit 16. This circuit comprises a pair of fluidic elements 18 and 20, of known design. The control ports 29, 31 of the fluidic device 18 are connected by passageways 32, 34 respectively, to the pressurization signal through chambers, or volumes 30, and orifices 28. The pressurization signal is fed to control port 33 of the fluidic device 20, through passageway 38 and orifice 36. The pressurization signal is fed to the other control port 35 of device 20 through passageway 46, chamber 44, passageway 42 and orifice 40, from conduit 14.

The outputs from the receivers 37, 39 respectively, of the fluidic devices 18 and 20, each pass through matched elements comprising inertances 50, orifices 52, and chambers 54. Passageways 56, 58 respectively connect the outputs of the fluidic devices 18 and 20 from the volumes 54 to opposed control ports 41, 43 of a proportional fluid amplifier 60.

From the compressor map it will be apparent that the stall line indicates the maximum pressure ratio across a compressor for a given air flow. Since the inlet pressure to a compressor may generally be considered a constant for a given altitude and flight speed, a stall condition is generally approached as the discharge pressure of the compressor increases, as would result from increased combustion in the combustor 11 of the engine shown in the drawing. A plot of increasing pressure of the pressurization signal, against time, is shown in FIG. 3. This plot indicates that as compressor discharge pressure increases and a stall condition is approached, there is first (Zone S) a relatively small rapid fluctuation in the pressurization signal, followed by relatively large fluctuations which terminate in a substantial loss in discharge pressure, indicating that a full stall condition has occurred.

With the described circuit, a stall anticipation signal is generated by the relatively small signal fluctuations of Zone S, permitting the operating point to be moved away from the stall line before a gross or full stall occurs.

The fluidic devices 18, 20 and the inputs thereto are matched so that with a steady state pressurization signal input, the outputs at the receivers 37 and 39 are equal, as are the inputs to the fluid amplifier 60 at control ports 41, 43. This assumes that equal momentums are provided in the power streams discharged from nozzles N of the fluidic devices 18, 20.

Similarly, where there is a steady state pressurization signal, the inputs to the control ports 41 and 43 maintain the power stream discharged from nozzle N of the fluid amplifier 60 in a central position so that there are equal recovered pressures in the receivers 45 and 47. It will also be seen that vents V are provided in the fluidic devices in the conventional fashion for proper operation thereof.

Since the pressurization signal follows matched flow paths to the control ports 29, 31 of the fluidic device 18, the power stream would never be deflected from the receiver 37 and an essentially constant input is provided as a reference at the control port 41 of fluid amplifier 60.

The fluidic device 20 is the essential element in generating the stall anticipation signal. With the described inputs to the fluidic device 20, relatively rapid changes or fluctuations in its pressure level will be attenuated by the volume 44 and are not reflected at the control port 35, thus maintaining an essentially constant pressure at this control port. On the other hand, the signal passing to the opposed control port 33 would reflect such pressure variations, causing the power stream to be displaced back and forth across the receiver 39 so that there would be a pulsating pressure output signal from the fluidic device 20. The inertance 50, orifice 52, and volume 54 function to remove the pulsations in the output signal from the fluidic device 20 so that there is a relatively steady but reduced pressure input at all times to the control port 43 of fluid amplifier 60.

When there is a pressure differential across the control ports 41, 43 of the fluid amplifier 60, resulting in a pressure increase in receiver 47 and a pressure decrease in receiver 45, the resultant pressure differential provides an output signal anticipatory of a stall condition. This anticipatory signal is converted by a transducer 62 into a mechanical signal which is fed to a main fuel control 64 to reduce the flow of fuel to the combustor 11 and thus move the operating point of the compressor away from a stall condition.

It is contemplated that under normal operating conditions fuel flow would otherwise be controlled through the conventional sensing of such parameters as temperature and compressor discharge pressure and engine speed in accordance with throttle setting. The stall anticipation signal which results in a reduction to fuel flow, in effect, is a modification of the normal scheduling of fuel flow and would be nulled out once the pressurization level were reduced sufficiently to reduce the fluctuations of Zone S. The compressor thus never operates beyond Zone S, where relatively large fluctuations result in the almost certain occurrence of a gross stall condition.

As pointed out above, when there are no rapid fluctuations in the pressurization signal, the output signals of the devices 18 and 20 are equal, and there is no pressure differential between the receivers 41, 43 of fluid amplifier 60. This holds true throughout the full range of pressurization signal levels from sea level to maximum altitude at any flight speed: FIG. 3 illustrates that a Zone S of rapid fluctuations occurs at a lower pressurization signal level at altitude. The same also holds true for normal changes in the pressurization signal level as the engine is accelerated or decelerated. This is due to the fact that the rate of fluctuation in Zone S would, normally, be greater than the rate of change in pressure level resulting from changes in altitude or engine speed. The volume 44 is sized to discriminate between such normal changes and the pressure fluctuations of Zone S (FIG. 2).

The reference pressure signal provided by fluidic device 18 functions as a compensating means to assure operation over a wide range of pressures since the output of device 20 could vary as a function of the level of the pressurization signal. This is to say that even though the power stream is not deflected, there will be changes in the recovered pressure in the receiver 39 as the strength of the pressurization signal varies normally between sea level and altitude conditions. However, any changes in the steady state output level of device 20 are matched and compensated by corresponding changes in the output of device 18.

It should be noted that the characteristics of compressors vary widely. Different compressor designs have different characteristics and individual compressors of the same design will have smaller variations in characteristics. This factor is particularly significant with respect to the rapidity of the pressurization signal fluctuation which most accurately predicts a stall condition. The pressure plot of FIG. 3 is in reality over-simplified, since different rapidities of pressure variation can occur just as in the case of sound. It has been found that variations between 250 and 1,000 cycles per second are most accurate and reliable in predicting the occurrence of a stall and that by reducing fuel flow upon detecting pressure signals of this frequency, a full or gross stall condition can be avoided while maintaining the output pressure of the compressor at a maximum level. The volume 44 is accordingly sized to perform this function.

It will also be appreciated that while the pressurization signal employed herein is derived from the discharge of the final stage of the compressor, an effective signal could possibly be derived from any stage, and the point for deriving the pressurization signal most effectively could vary from compressor to compressor, especially between different compressor designs.

While the present disclosure utilizes control of fuel flow to change the compressor operating conditions in a manner which avoids a stall condition, it is possible to change other compressor operating conditions to achieve the same end, as for example, variable stator compressors provide means for varying the flow area of air through the compressor, which is also effective in avoiding a stall condition.

The present fluidic circuit is essentially immune to changes in the level or strength of the pressurization signal, but proportionately amplifies cyclic variations which are anticipatory of a stall condition. The operating point changing means are actuated proportionate to this anticipatory signal so that the corrective action taken is proportionate to the rate at which stall is being approached.

These and other variations in the specific embodiment disclosed will occur to those skilled in the art, and the scope of the present inventive concepts is therefore to be derived from the claims.

Having thus described the invention, what is claimed as novel and desired to be secured by Letters Patent of the United States is:

1. In a gas turbine engine having a compressor and means for changing the operating point of said compressor towards and away from a stall condition,
    passageway means connected to and deriving a fluidic static pressure signal from the discharge of a compressor stage,
    fluidic means for proportionally amplifying cyclic variations in said pressure signal when said variations exceed a given frequency, to thereby provide a stall anticipation signal which varies in magnitude proportionate to the magnitude of said cyclic variations in said pressurization signal,
    means responsive to the stall anticipation signal for actuating the operating point changing means at a rate proportionate to the stall anticipation signal and in a direction away from a stall condition.

2. In a gas turbine engine having a compressor and means for changing the operating point of said compressor towards and away from a stall condition,
    passageway means connected to and deriving a fluidic pressurization signal from said compressor,
    fluidic means for proportionally amplifying cyclic variations in said pressurization signal when said variations exceed a given frequency, to thereby provide a stall anticipation signal which varies in magnitude proportionate to the magnitude of said cyclic variations in said pressurization signal,
    means responsive to the stall anticipation signal for actuating the operating point changing means at a rate proportionate to the stall anticipation signal and in a direction away from a stall condition,
    said fluidic means comprising a fluidic device having a pair of opposed control ports effective upon a fluidic power stream to vary the effective recovered pressure in receiver means as a function of the magnitude and rate of deflection of the power stream caused by a pressure differential between said control ports, changes in said recovered pressure serving as the stall anticipation signal,
    passageway means connecting said fluidic pressurization signal to said control ports, and
    means for attenuating cyclic variations, above said given frequency, in one of said fluidic connecting means whereby there will be no substantial amplification of pressure variations (in said pressurization signal) below said given frequency.

3. In a gas turbine engine as in claim 2 wherein,
    the attenuating means are in the form of a chamber sized to attenuate cyclic variations above approximately 250 cycles per second and the fluidic device is responsive to cyclic variations of at least 1,000 cycles per second, whereby the stall anticipation signal reflects cyclic pressure fluctuations in the pressurization signal in the range of 250–1,000 cycles per second.

4. In a gas turbine engine as in claim 2 further comprising,
    pressure compensating means including a second fluidic device having a pair of opposed control ports effective upon a fluidic power stream to vary the effective recovered pressure in receiver means,
    passageway means connecting said fluidic pressurization signal to the opposed control ports of said second fluidic device through passageways having equal fluid impedance, whereby the power stream of the second fluidic device will not be deflected but the recovered pressure at the receiver means thereof will be a function of the level of the pressurization signal,
    a third fluidic device having a pair of opposed control ports to vary the recovered pressure in receiver means thereof,
    passageway means respectively connecting the receiver means of the first and second fluidic devices to the control ports of the third fluidic device,
    whereby changes in the pressure level of the receiver means of the third fluidic device serve as a stall anticipation signal with any changes in the recovered pressure of the first fluidic device, caused by changes in the level of the pressurization signal, compensated for by like changes in the recovered pressure of said second fluidic device as reflected at the control ports of the third fluidic device.

5. In a gas turbine engine as in claim 4 wherein,
    orifice means are placed in each of the passageway connections to the control ports of said first and second fluidic devices, thereby isolating said devices from one another.

6. In a gas turbine engine as in claim 5 wherein,
    means are provided for converting the recovered pressures of said first and second fluidic devices to relatively steady pressures,
    the receiver means of the third fluidic device comprises a pair of receivers respectively on opposite sides of the normal discharge path of the power stream, and the means for actuating the operating changing means is responsive to a pressure differential between the receivers of said third fluidic device.

7. A fluidic circuit for detecting rapid cyclic variations in a pressurized fluid source, having varying pressurization levels, said fluidic circuit comprising,
    means connected to said pressurized fluidic source for deriving a fluidic pressurization signal of varying pressure levels therefrom,
    fluidic means for proportionally amplifying cyclic variations in said pressurization signal when said variations exceed a given frequency, said fluidic means comprising a fluidic device having a pair of opposed control ports effective upon a fluidic power stream to vary the effective recovered pressure in receiver means, as a function of the magnitude and rate of deflection, of the power stream caused by a pressure differential between said control ports, changes in said recovered pressure serving as a detection signal,
    passageway means connecting said pressurization signal to said control ports,
    orifice means isolating the signal connecting means to the two control ports from each other,
    means for attenuating cyclic variations, above said given frequency, in one of said fluidic connecting means, whereby there will be no substantial amplification of pressure variations (in said pressurization signal) below said given frequency.

8. A fluidic circuit as in claim 7 further comprising,
    pressure compensating means including a second fluidic device having a pair of opposed control ports effective upon a fluidic power stream to vary the effective recovery in receiver means, passageway means connecting said pressurization signal to the opposed control ports of said second fluidic device through passageways having equal fluid impedance, whereby the power stream of the second fluidic device will not be deflected but the recovered pressure at the receiver means thereof will be a function of the level of the pressurization signal, a third fluidic device having a pair of opposed control ports to vary the recovered pressure in receiver means thereof, passageway means respectively connecting the receiver means of the first and second fluidic devices to the control ports of the third fluidic device, whereby changes in the pressure level of the receiver means of the third fluidic device serve as a detection signal with any changes in the recovered pressure of the first fluidic device, caused by changes in the level of the pressurization signal, compensated for by like changes in the recovered pressure of the second fluidic device as reflected at the control ports of the third fluidic device.

9. A fluidic circuit as in claim 7 further comprising, orifice means in each of the passageway connections to the control ports of said second fluidic device, thereby isolating said devices from each other, means for converting the recovered pressures of said first and second fluidic devices to relatively steady pressures, and the receiver means of the third fluidic device comprises a pair of receivers respectively on opposite sides of the normal discharge path of the power stream whereby the detection signal is in the form of a pressure differential between the two receivers of the third fluidic device.

References Cited

UNITED STATES PATENTS 3,302,398   2/1967   Taplin et al. _____ 60—39.28

SAMUEL FEINBERG, Primary Examiner

U.S. Cl. X.R.

60—39.28; 137—81.5